US006991012B2

(12) United States Patent
Mitchell et al.

(10) Patent No.: US 6,991,012 B2
(45) Date of Patent: Jan. 31, 2006

(54) APPARATUS FOR SAWING A WORKPIECE

(75) Inventors: Rory Matthew Mitchell, Salmon Arm (CA); Brian Stroud, Salmon Arm (CA)

(73) Assignee: Coe Newnes/McGehee Inc., Salmon Arm (GB)

( * ) Notice: Subject to any disclaimer, the term of this patent is extended or adjusted under 35 U.S.C. 154(b) by 21 days.

(21) Appl. No.: 10/625,741

(22) Filed: Jul. 24, 2003

(65) Prior Publication Data

US 2004/0134564 A1 Jul. 15, 2004

Related U.S. Application Data

(60) Continuation-in-part of application No. 10/342,400, filed on Jan. 15, 2003, which is a continuation of application No. 09/505,255, filed on Feb. 15, 2000, now Pat. No. 6,520,228, which is a continuation of application No. 09/211,047, filed on Dec. 15, 1998, now Pat. No. 6,039,098, which is a division of application No. 08/822,947, filed on Mar. 21, 1997, now Pat. No. 5,884,682.

(60) Provisional application No. 60/398,133, filed on Jul. 25, 2002, provisional application No. 60/025,086, filed on Aug. 30, 1996, provisional application No. 06/015,825, filed on Apr. 17, 1996, provisional application No. 60/013,803, filed on Mar. 21, 1996.

(51) Int. Cl.

| | |
|---|---|
| *B23Q 15/02* | (2006.01) |
| *B23Q 15/08* | (2006.01) |
| *B23Q 15/24* | (2006.01) |
| *B23Q 15/26* | (2006.01) |

(52) U.S. Cl. ...................... 144/394; 144/398; 144/404; 144/408; 144/3.1; 144/39; 83/75.5; 83/364; 83/368

(58) Field of Classification Search ................ 144/357, 144/369, 374, 376, 378, 394, 398, 399, 403, 144/408, 3.1, 39, 242.1, 404; 83/75.5, 76.7, 83/76.8, 364, 365, 368, 370, 371
See application file for complete search history.

(56) References Cited

U.S. PATENT DOCUMENTS

| | | | | |
|---|---|---|---|---|
| 4,239,072 A | | 12/1980 | Merilainen | |
| 4,440,203 A | | 4/1984 | Ostberg | |
| 4,485,861 A | | 12/1984 | Nilsson et al. | |
| 4,548,247 A | | 10/1985 | Eklund | |
| 4,599,929 A | * | 7/1986 | Dutina | 83/821 |
| 4,637,443 A | | 1/1987 | Jansson | |
| 4,879,659 A | | 11/1989 | Bowlin et al. | |
| 4,881,584 A | * | 11/1989 | Wislocker et al. | 144/39 |
| 4,947,909 A | | 8/1990 | Stroud | |
| 5,143,127 A | | 9/1992 | Rautio | |
| 5,232,030 A | | 8/1993 | Knerr et al. | |

(Continued)

FOREIGN PATENT DOCUMENTS

CA 2022857 4/1996

(Continued)

*Primary Examiner*—Derris H. Banks
*Assistant Examiner*—Shelley Self
(74) *Attorney, Agent, or Firm*—Antony C. Edwards

(57) ABSTRACT

A method of forming a workpiece into sectioned parts using a pair of laterally translatable chipping heads and, downstream, a cutting device of the type having a plurality of rotatable cutting members mounted for rotation on a common axis which is movable and including workpiece transport means for moving the workpiece from a starting position to a final position along a path which extends first past the chipping heads and then past the cutting device.

10 Claims, 8 Drawing Sheets

U.S. PATENT DOCUMENTS

| | | | | | |
|---|---|---|---|---|---|
| 5,421,386 | A | | 6/1995 | Lundstrom | |
| 5,469,904 | A | | 11/1995 | Kontiainen | |
| 5,722,474 | A | | 3/1998 | Raybon et al. | |
| 5,761,979 | A | * | 6/1998 | McGehee | 83/425.3 |

FOREIGN PATENT DOCUMENTS

| | | |
|---|---|---|
| GB | 2 068 294 A | 8/1981 |

* cited by examiner

Fig 1a
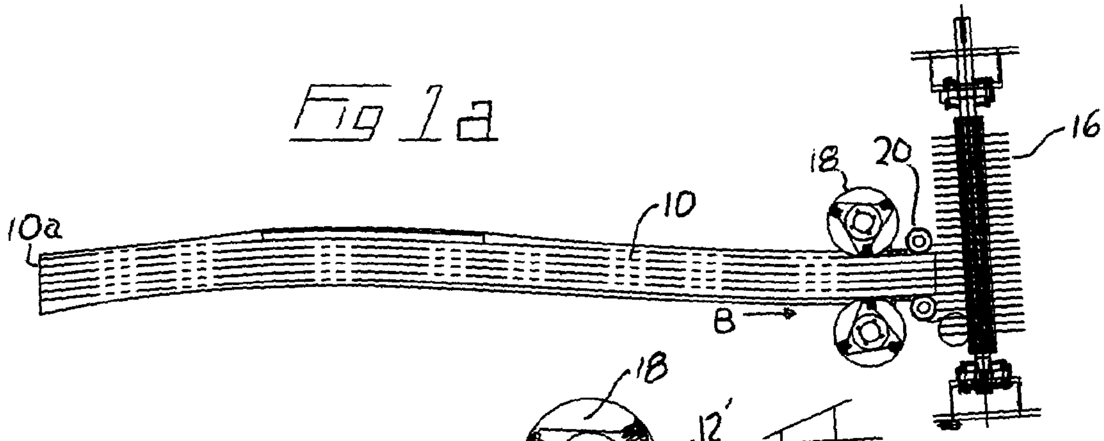
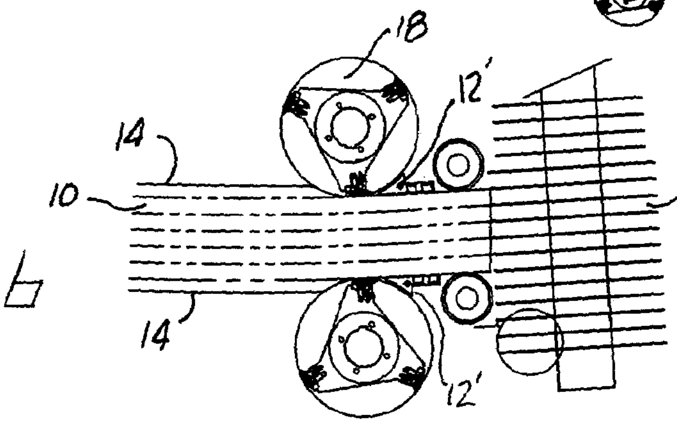
Fig 1b
Fig 2
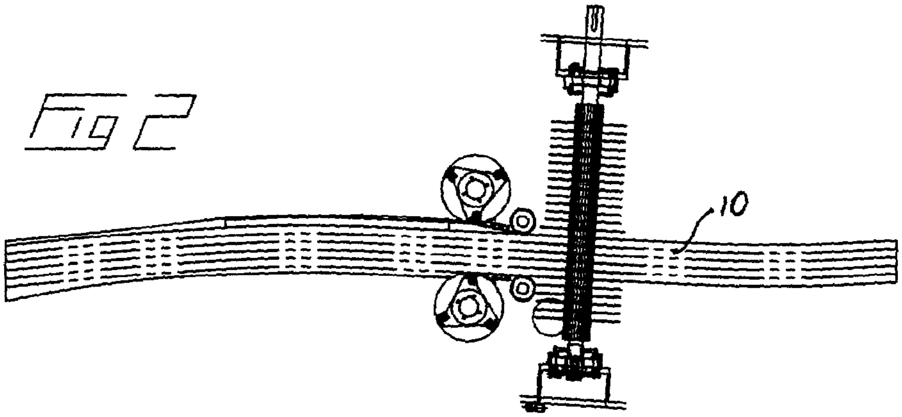
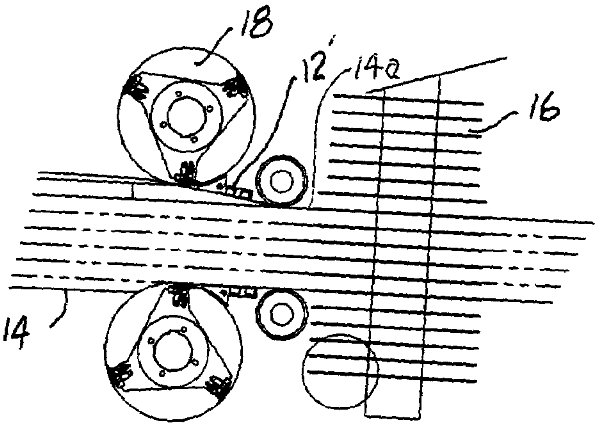
Fig 2a

APPARATUS FOR SAWING A WORKPIECE

CROSS REFERENCE TO RELATED APPLICATIONS

This application claims priority from U.S. Provisional Patent Application No. 60/398,133 filed Jul. 25, 2002 entitled Curved Sawing Gang and is a Continuation-In-Part of U.S. patent application Ser. No. 10/342,400 filed Jan. 15, 2003 which is a Continuation of U.S. patent application Ser. No. 09/505,255 filed Feb. 15, 2000, now U.S. Pat. No. 6,520,228 which is a Continuation of U.S. patent application Ser. No. 09/211,047 filed Dec. 15, 1998, now U.S. Pat. No. 6,039,098 which is a Division of U.S. patent application Ser. No. 08/822,947 filed Mar. 21, 1997 now U.S. Pat. No. 5,884,682 which claims priority from U.S. Provisional Patent Application No. 60/013,803 filed Mar. 21, 1996, U.S. Provisional Patent Application No. 60/015,825 filed Apr. 17, 1996 and U.S. Provisional Patent Application No. 60/025,086 filed Aug. 30, 1996 entitled Position-Based Integrated Motion Controlled Curve Sawing.

FIELD OF THE INVENTION

This invention relates to the field of sawmill machinery and in particular to an apparatus for sawing a workpiece, the apparatus including a pair of independently laterally actuable chipping heads upstream of a sawing machine to provide for the recovery of a short side board from a workpiece.

BACKGROUND OF THE INVENTION

In most sawmills a cant is fed into a gang saw either top first or butt first. Chipping heads square the sides of the cant, which then is guided toward the saws by a series of upstream hold down rolls and a single pair of anvils. These anvils are positioned immediately downstream of the chipping heads, in a fixed spaced apart relationship on either side of the cant. The fixed anvils, the chipping heads and the saws are positioned for optimal board recovery from the cant according to instructions from an optimizer. Due to the fixed positioning of the anvils, the chipping head can not be positioned into the cant which results in excessive amounts of chipping when cants are fed butt first or for example when they have flares or bulges along their length.

The fixed anvils are spaced apart to provide a minimal clearance for through-passage of the cant. However, when asymmetric chipping loading occurs on one side of cant, for example when the chipping knives impact a side of the cant where more chipping is required, this loading results in the cant being moved laterally toward the opposite anvil. Further, the upstream hold down rolls are generally closely linearly spaced along the feed line of the cant. When a cant has traveled downstream past the last hold down roll it will be supported only by the fixed anvils. Asymmetric chipping loads may cause the cant to deflect laterally away from the optimizer's optimized board recovery solution.

SUMMARY OF THE INVENTION

In one embodiment, the present invention includes a pair of independently laterally actuable chipping heads upstream of a pair of associated combination anvils/chip chutes (or deflectors) hereafter collectively referred to as anvils and live press rolls positioned on each side of a cant. The chipping heads open opposite faces of the cant. The anvils and press rolls guide the cant toward and through the gang saw. The anvils and press roll are positioned adjacent to saws and immediately downstream from the chipping heads. The pair of anvils and the pair of press rolls on each side of the cant are independently movable by actuation of a linear positioner toward or away from the sides of the cant and are independently movable with respect to the associated chipping head. The linear positioner may translate them linearly laterally or pivot them about the axes of rotation of the chipping heads. The chipping heads anvils and press rolls follow a path according to an optimized cut path determined by an optimizer. The press rolls are brought into firm contact with the sides of the cant as the cant travels toward the saws so as to resist asymmetrical chipping forces on the cant, which tend to deflect the cant from the optimized cutting solution. Since the press rolls are live and positioned adjacent to the saws, the trailing end of the cant is better stabilized and the lateral unsupported distance on the cant is markedly reduced thereby allowing shorter cants to be processed.

The chipping heads and saws may be skewed and translated relative to the infeed direction so as to follow the curve of the cant. The chipping heads may be moved out away from the faces being formed by the chipping heads so as to keep the cutting forces equal at the butt or in the event of a bulge or flare in the thickness of the cant, and so that a side board may be created in the instance where the butt, bulge or flare is substantial enough to contain enough material in thickness and length to create the extra side board.

In one embodiment the apparatus according to the present invention is a curve sawing gang which includes an opposed pair of selectively translatable chipping heads co-operating with the articulating curve sawing gang saw cluster wherein the chipping heads are mounted to, and selectively translatable in a lateral direction relative to the long axis of the workpiece. A further embodiment of the apparatus according to the present invention includes an opposed pair of selectively translatable chip heads co-operating with the articulating curve sawing gang cluster wherein the chip heads are mounted and separately selectively translatable in a lateral direction relative to the long axis of the workpiece in front of, and separate from, the gang saw arbor and carriage.

In summary, the present invention may be characterized as an apparatus for sawing a workpiece where the apparatus includes a transport conveyor for moving the workpiece downstream along a path through a plurality of stations. The plurality of stations may include a workpiece scanning station including sensing means for sensing the dimensions of the workpiece and processing means associated with the sensing means for analyzing the sensed dimensions provided by the sensing means and providing apparatus control instructions. The plurality of stations may also include a chipping station downstream of the scanning station including a pair of chipping heads mounted in laterally opposed relation on either side of the path on lateral translation means for selectively controllable lateral translation of the chipping heads relative to the transport conveyor. The plurality of stations may further include cutting station such as a sawing station downstream of the chipping station, the sawing station including a cutting tool such as a gang saw, that is, an array of circular saws mounted on a common shaft. The cutting tool may be rotationally movable about a pivot axis relative to the path. The axis is in what may be called the geometric center of the machine but not necessarily vertically below the feed path of each cant. Means are provided for independently actuating the lateral translation means.

The processing means controls the independent actuation of the lateral translation means in accordance with the apparatus control instructions.

In the chipping station each chipping head is independently and actively laterally translatable so that at least one of the chipping heads is laterally translatable inwardly and outwardly relative to the workpiece when the workpiece is between the pair of chipping heads so as to recover a side board from a portion of the workpiece having a width larger than adjacent portions of the workpiece.

For curve sawing applications, that is, for curve sawing a workpiece into parts of desired dimensions where the workpiece has non-uniform original dimensions, the gang saw may be pivotally movable relative to the transport conveyor to vary the position of the gang saw relative to the workpiece being carried by the transport conveyor past the gang saw and along the path. The apparatus then further includes means for moving the gang saw with the processing means controlling actuation of the means for moving the gang saw in accordance with the apparatus control instructions. In one curve sawing embodiment the pair of chipping heads and the gang saw are mounted on a support frame for simultaneous pivotable movement of the pair of chipping heads and the gang saw whereby the pair of chipping heads and the gang saw are both commonly pivotally moveable relative to the transport conveyor to vary the position of both the pair of chipping heads and the gang saw relative to the workpiece being carried by the transport conveyor and along the path. The pair of chipping heads, the gang saw and the arbor are movable linearly across the infeed path and are pivotally mounted so as to be simultaneously rotationally movable relative to a base and the path. This addresses the situation wherein, although the side press rolls when engaged provide intermediate drive and support between the infeed and outfeed hold down rolls, they do not assist in the event that a "no decision" is returned from the optimizer. The "no decision" causes the chip heads, anvils and press rolls to all withdraw from engaging the workpiece. In that event, the distance between the infeed and outfeed hold down rolls is too great for a short workpiece since the larger chip head and anvil roll has increased the distance between hold down rolls. The solution is to mount the chip heads and anvils on the infeed separate from the saw box and add a narrow hold down roll between the chip heads and saws for use when a "no decision" workpiece is encountered. A side benefit of this is that the "dead zone" comprising the longitudinal distance from the start of the chip heads to the tail of the saws is roughly halved. Thus the chip heads can set for the next workpiece while the saws are still cutting in the last workpiece, making for shorter cant gaps and higher piece counts. Additionally, an intermediate hold down roll may be provided to engage the workpiece between the chipping heads and the saws.

In one embodiment of the present invention a pair of press rolls are mounted with one press roll on either side of the path and between the pair of chipping heads and the sawing station. Each press roll is selectively laterally translatable on press roll translation means according to the apparatus control instructions so as to counter asymmetric lateral chipping forces of the pair of chipping heads asymmetrically operating on the workpiece, whereby lateral translation of the workpiece relative to the transport conveyor is inhibited. A pair of anvils may also be provided, each mounted in relation to the press rolls, one anvil per press roll on either side of the path and between the pair of chipping heads and the pair of press rolls. The pair of anvils are laterally translatable simultaneously with lateral translation of the pair of press rolls. Each press roll may also be pivotally mounted on a press roll pivot means, such as a rigid frame, bracket or member, for pivoting of each press roll about an axis of rotation of a corresponding chipping head simultaneously with the lateral translation of each the press roll. The corresponding anvil may also pivot about the same axis of rotation. Alternatively the press roll may translate linearly and be connected to the anvil that pivots about the chipping head axis.

The method according to the present invention of forming a workpiece into sectioned parts using a pair of laterally translatable chipping heads and, downstream, a cutting device of the type having a plurality of rotatable cutting members mounted for rotation on a common axis which is movable and including workpiece transport means for moving the workpiece from a starting position to a final position along a path which extends first past the chipping heads and then past the cutting device, includes the steps of: passing the workpiece from the starting position through a scanning position; scanning the workpiece with a detection device to determine dimensional information of the workpiece; sending the dimensional information to a computing device which analyzes the dimensional information and calculates a cutting solution for the scanned workpiece; passing the workpiece from the scanning position toward the chipping heads and the cutting device while orienting the workpiece for movement through the chipping heads and the cutting device substantially along a linear axis of movement; engaging the workpiece with the chipping heads and subsequently with the cutting device by passing the workpiece past the chipping heads and the cutting device while actively controlling the rotational position of the cutting device about the common axis of the cutting device relative to the workpiece, both of which in accordance with the cutting solution so as to cut a side board from laterally wider portions of the workpiece; and transporting the workpiece and sectioned parts from the cutting device.

BRIEF DESCRIPTION OF THE DRAWINGS

FIG. 1*a* is a plan view illustrating the commencement of chipping and sawing of a curved cant in the curve sawing gang according to the present invention.

FIG. 1*b* is an enlarged portion of FIG. 1*a*.

FIG. 2 is a plan view illustrating the chipping heads of FIG. 1*a* adjusting outwardly to recover a short sideboard.

FIG. 2*a* is an enlarged portion of FIG. 2.

DETAILED DESCRIPTION OF EMBODIMENTS OF THE INVENTION

Figure 1:
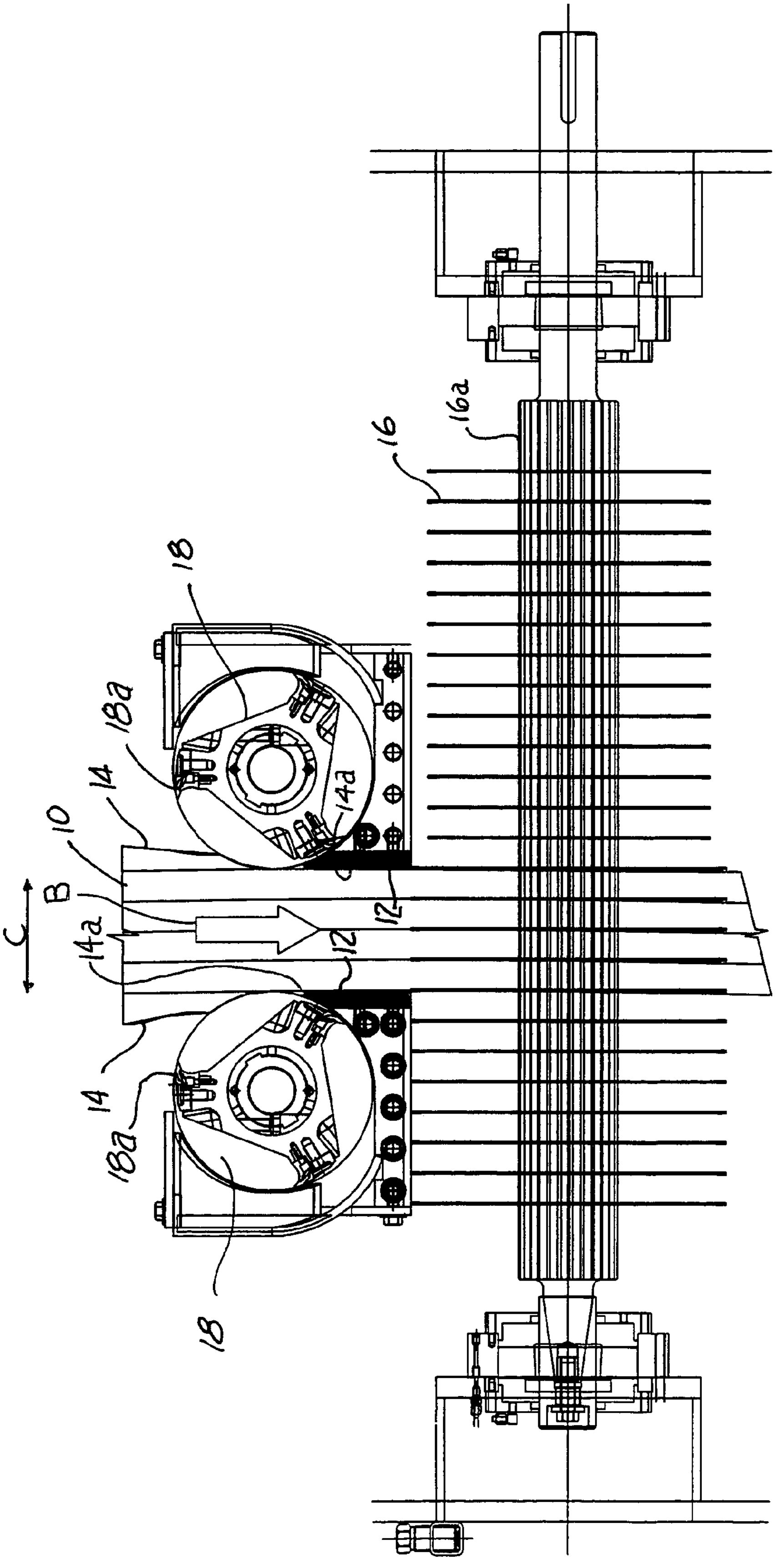
PRIOR ART Fig 1
FIG. 1 is a plan view illustrating prior art chipping heads and anvils.
Figure 1C:
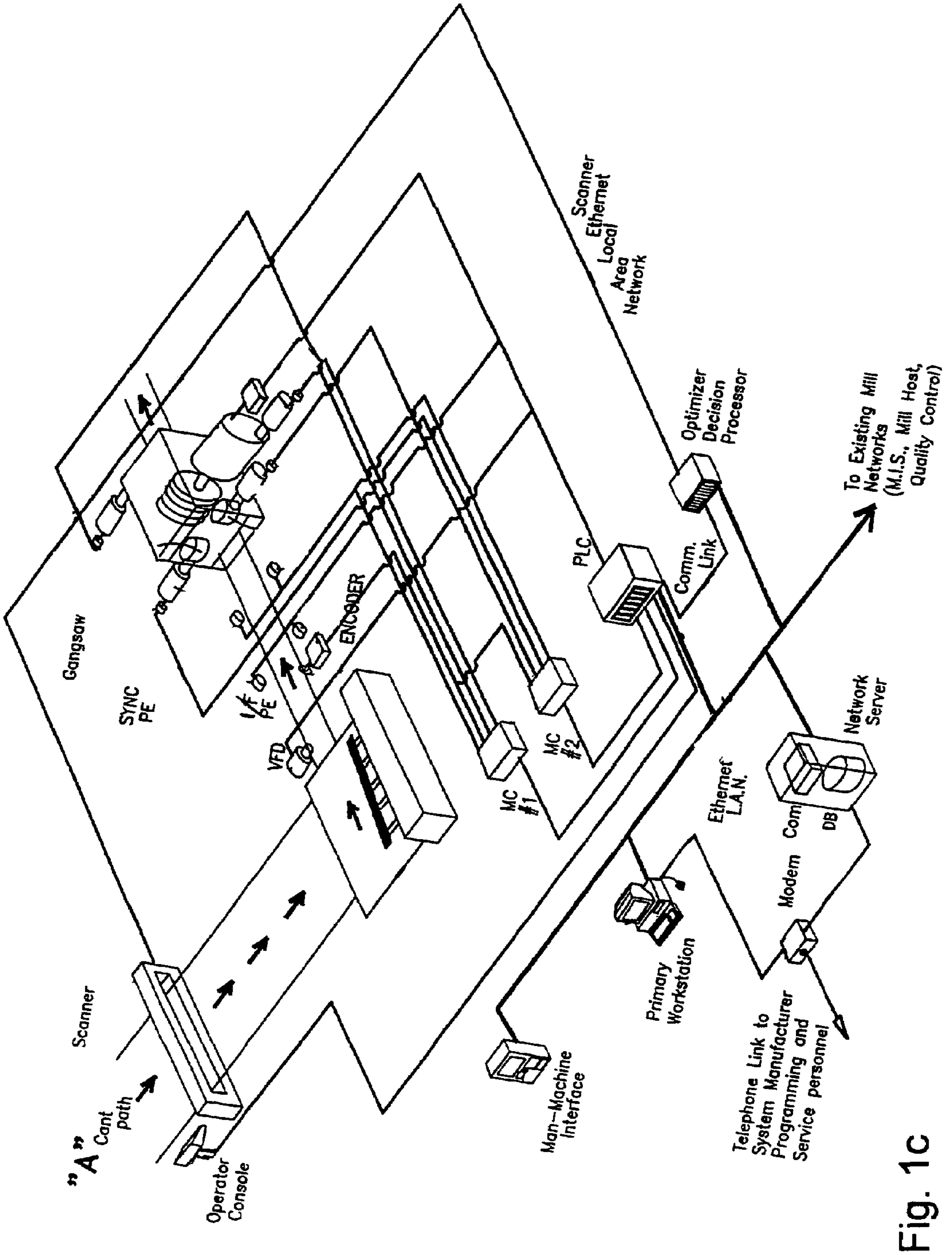
FIG. 1*c* is a schematic representation of a typical sawing system including the apparatus according to the present invention.
Figure 3:
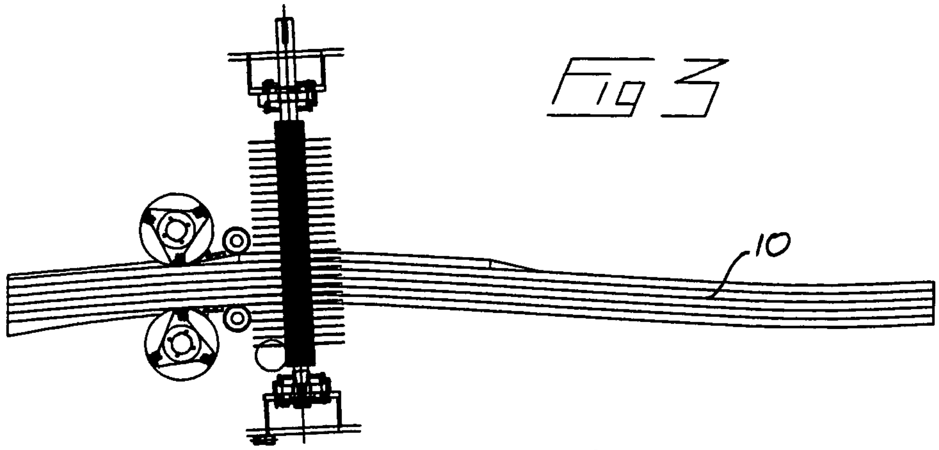
FIG. 3 is a plan view illustrating the chipping heads of FIG. 2 adjusting inwardly at the end of a short sideboard.
Figure 3A:
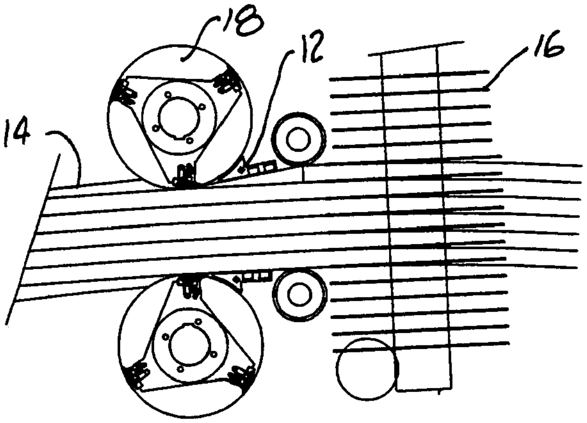
FIG. 3*a* is an enlarged portion of FIG. 3.
Figure 4:
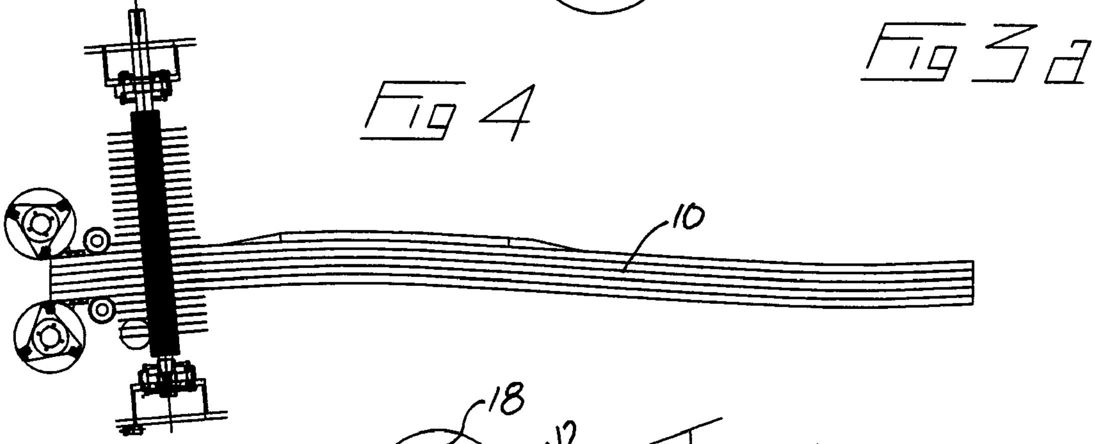
FIG. 4 is a plan view illustrating the chipping heads of FIG. 3 at the conclusion of the chipping solution.
Figure 4A:
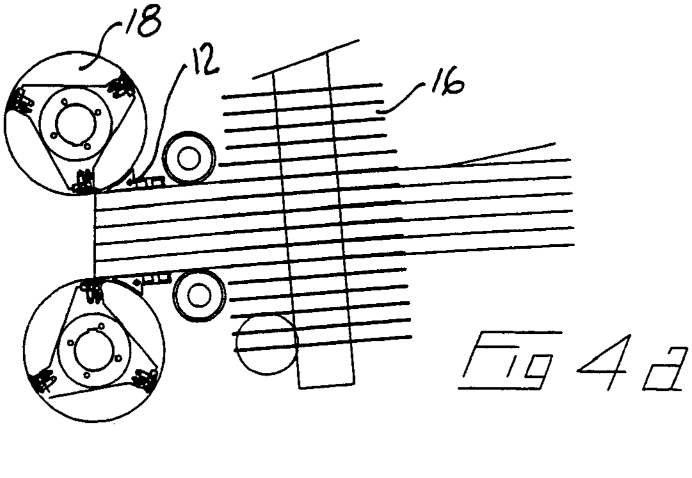
FIG. 4*a* is an enlarged portion of FIG. 4.
Figure 5:
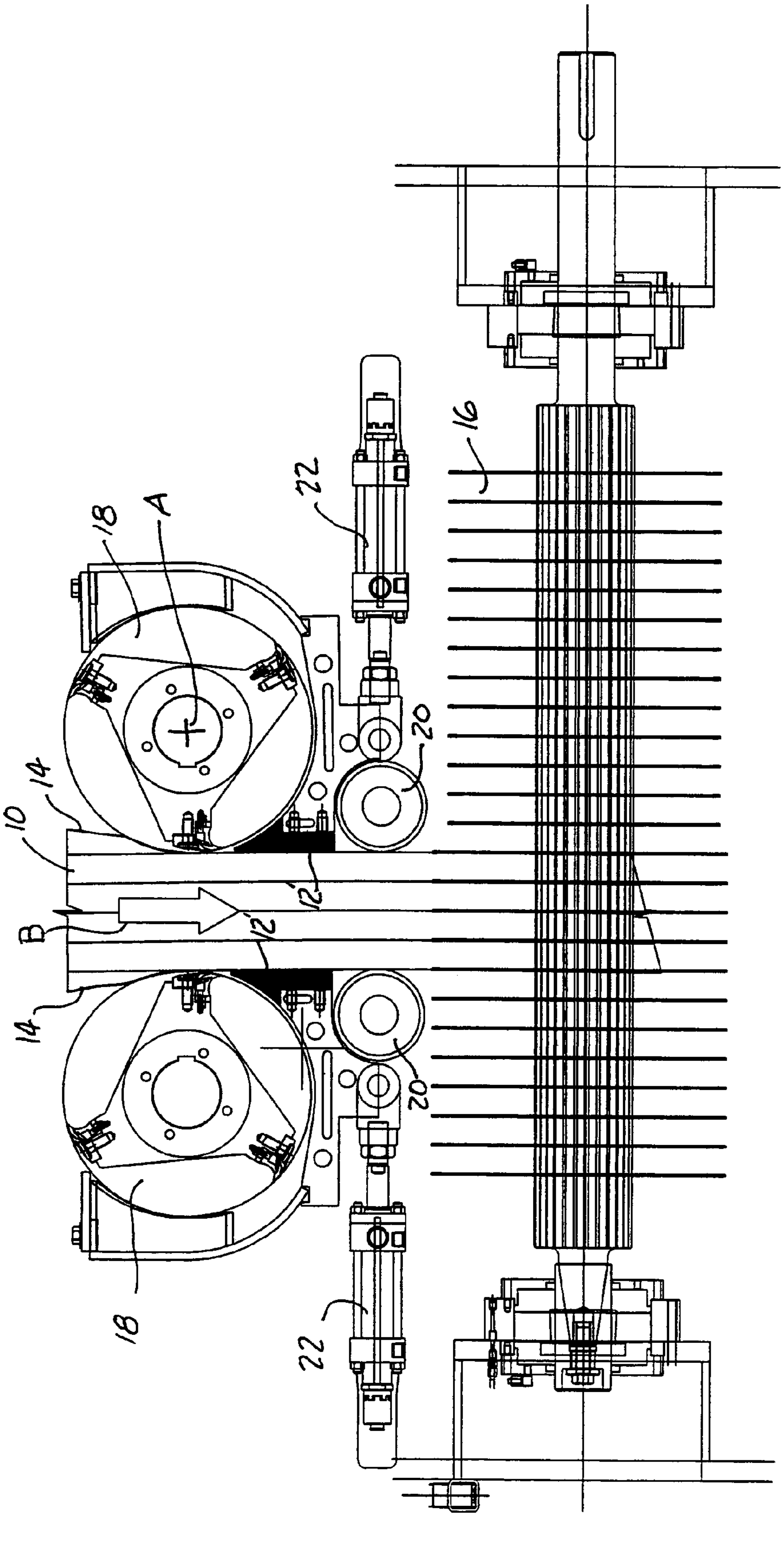
FIG. 5 is a plan view illustrating the curve sawing gang of the present invention and in particular the actuating mechanism of the live press rolls adjacent to the saw arbor.

With reference to the drawing figures, wherein similar characters of reference denote corresponding parts in each view, as seen in FIG. 1, in the prior art a curved cant 10 was fed between anvils 12 located adjacent the sides 14 of the cant, for accurate infeed to arbor-mounted saws 16 mounted on splined arbor 16*a*. Anvils 12 may be mounted intermediate of, or between upstream chipping heads 18 and downstream saws 16. In a curve sawing application, saws 16 in gangsaw 17 are selectively positioned relative to the cant 10 by slewing (lateral translation) and skewing (pivoting relative to the infeed direction) of the arbor or arbor supporting frame 30 or carriage according to instructions from an optimizer for optimized recovery of boards from cant 10. Such curve sawing is described in our previous patent applications, particulars of which are provided above, from which this application claims priority, all of which prior patent applications being incorporated herein by reference.

In the prior art anvils 12 are mounted a fixed distance apart. Such fixedly positioned anvils may be spaced apart a distance slightly greater than the width of cant 10 downstream of the chipping heads to provide minimal frictional engagement between the anvils and the faces 14*a* formed from sides 14. That is, faces 14*a* are downstream of the chipping heads, the chipping heads operating on sides 14, that is the upstream sides as they are fed into the chipping heads. As knives 18*a* of chipping head 18 impact sides 14 of cant 10, asymmetric chipping loading can occur. For example, dissimilar chipping depth or wood density occurring on one side of cant 10 results in knives 18*a* impacting with greater lateral force, resulting in lateral movement of cant 10 toward the opposite anvil. This movement results in the cant being moved slightly out of the optimized path. When cants are fed butt first toward saws 16, the chipping head 18 may not be moved laterally relative to the cant, for example, may not be positioned inwardly without conflict with anvils 12. The lack of actively controlled lateral movement of the chipping heads to relieve chipping forces or to accommodate bulges, flares and butts, for example so that a side board cannot be recovered, results in inefficient wood recovery from the cant.

In the embodiment of the present invention illustrated in FIGS. 1*a* onwards, which although not intending to be limiting is also a curve sawing apparatus, chipping head 18 may be mounted slightly upstream from saws 16 sufficient to permit mounting of live that is actively translatable press rolls 20 between anvils 12' and saws 16. Anvils 12' and press rolls 20 on either side of cant 10 are independently and selectively translatable laterally toward or away from, that is inwardly or outwardly of, the sides 14*a* of cant 10 by the operation of linear positioner 22. Press rolls 20 operate independently from chipping heads 18. Linear positioners 22 position the press rolls so to follow the prescribed optimized path, according to an optimized solution from the optimizer, of chipping heads 18 and saws 16. Linear positioners 22 cause both anvils 12' and press rolls 20 to pivot about centers A, that is, about the axes of rotation A of chipping heads 18, allowing press rolls 20 to be moved into firm contact with the sides 14*a* of cant 10, thereby inhibiting lateral deflection of cant 10 due to asymmetric chipping loading. Chipping heads 18 and saws 16 are driven, that is rotated, in the direction of travel B of cant 10. Press rolls 20 are driven. The use of a driven press roll controls the velocity with which the boards sawn from cant 10 exit saws 16.

Figure 6:
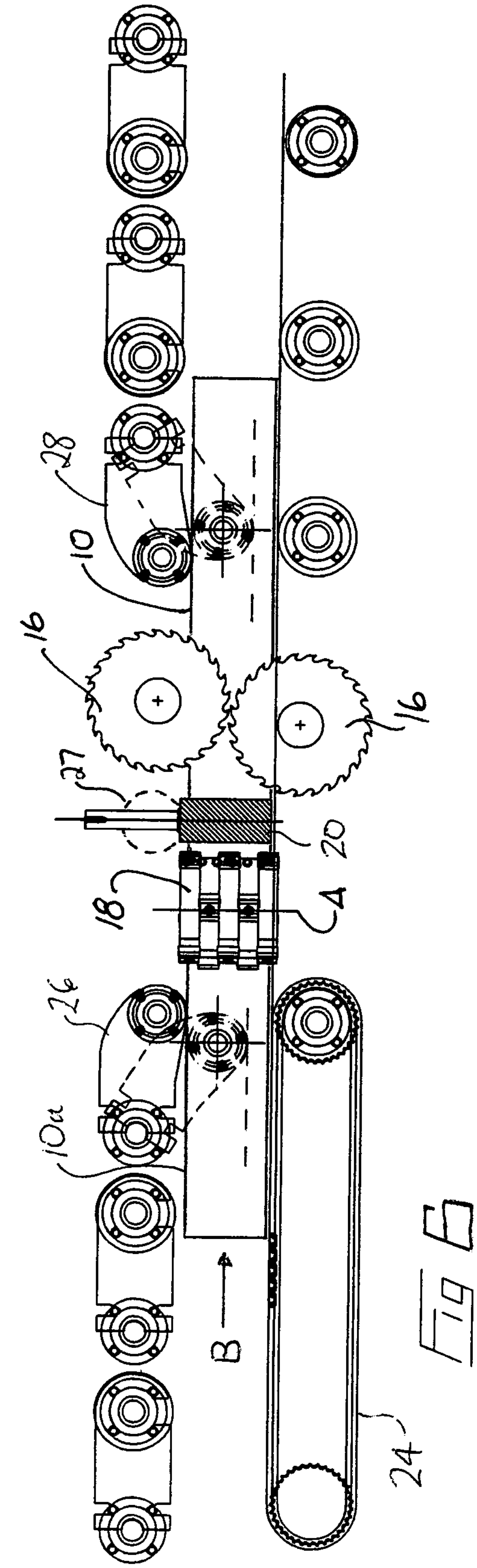
FIG. 6 is a side elevation diagrammatic view of an infeed and outfeed transfer sandwiching a chipping head, press roll and double arbor gang saw therebetween.

As stated above, asymmetric chipping loads may cause cant 10, more often the trailing end 10*a,* to move sideways, that is, laterally in direction C relative to the infeed direction B of the cant on infeed conveyor 24. As seen in FIG. 6 and in the more detailed illustration of FIG. 7, in the prior art once trailing end 10*a* of the cant is downstream of the last infeed hold down roll 26, that is the third hold down roll in FIG. 6, in the absence of the intermediate rolls 20 according to the present invention, the cant relies on support from the outfeed hold down rolls downstream of the saws, in particular the fourth hold down 28 roll, hold down in FIG. 6 as being the closest hold down roll downstream from hold down roll 26. As hold down roll 28 may be some distance away from hold down roll 26, asymmetric chipping loads may cause the cant to deflect away from the greater load and thus the cant does not follow the solution as prescribed by the optimizer with consequent recovery loss. The mechanics of this are as follows: In the prior art the anvils 12 behind, that is, downstream of the drum chip heads 18 have only very short parallel faces and conventionally some clearance is allowed between the anvils and the cant for functional reasons. The remainder of the faces on the anvils are angled outwardly from the cant to allow clearance for curved solutions. When one chip head is doing more work than the other, this head moves the cant at each knife impact to take up the clearance allowed on the short parallel part of the opposite anvil. As each succeeding knife impacts the cant, the cant slowly translates laterally over, an estimated 0.020 inch per knife impact, which at a chip length of for example seven eighths of an inch, will result in a movement of about one quarter inch per foot.

As also stated above, another drawback of the use of fixed anvils is that the chip heads cannot set in when cants are fed butt first. For cants that are fed top first, the optimizer recognizes a short length board on the outside of one or both sides of the cant and will move out to a new width to make such a short board. In addition this procedure chips away a long feathered end of this short board which minimizes downstream handling problems.

As also stated above, the opposite is not possible because of the fixed anvil. The present invention replaces the fixed anvils 12 with anvils 12' that pivot about the chip head centers A, where the position of each anvil 12' is controlled by linear positioners 22. Additionally intermediate rolls 20 may incorporate at least one driven roll, so that rolls 20 will both firmly grip and drive the cant sides 14*a,* rolls 20 thereby providing an intermediate control between the third and fourth hold down rolls as seen in FIG. 6. An additional or intermediate hold down roll 27 may be employed downstream of the chipping heads 18 for example intermediately between the chipping heads and saws. Thus lateral cant migration is largely inhibited and shorter cants may now be processed without cant slippage. Also, the chip heads may now set in as well as out relative to the cant so that cants fed both butt and top first may gain the advantage of the manufacture of short boards found by the optimizer.

Figure 7:
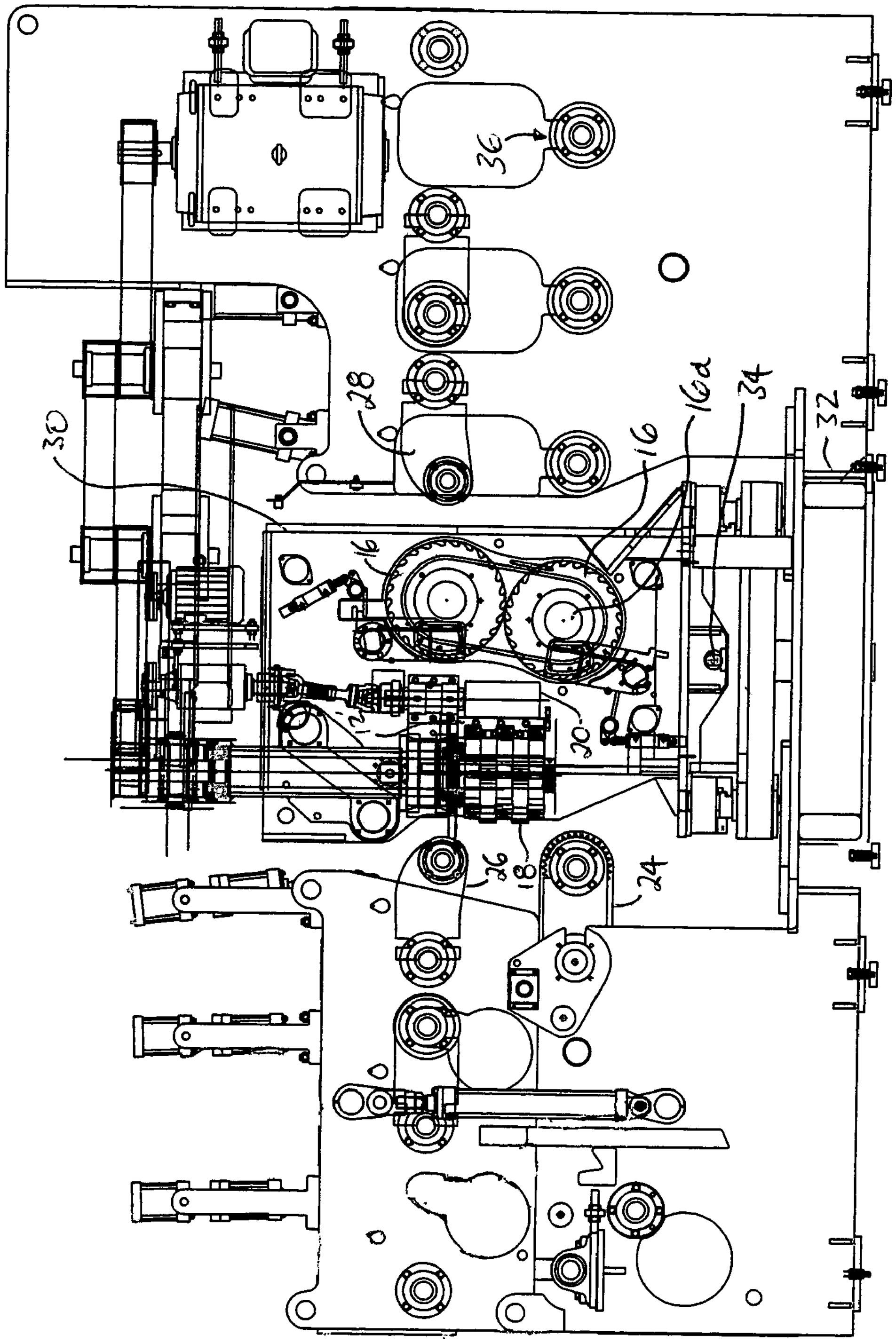
FIG. 7 is a side elevation view of an assembled curve sawing gang incorporating chipping heads according to the present invention commonly mounted with a gang saw on a curve sawing box.

In the curve sawing saw box embodiment of FIG. 7, chipping heads 18, anvils 12', active press rolls 20 and saws 16 mounted on saw arbors 16*a* are all mounted on a common support frame or saw box 30. The saw box slews and skews relative a base 32 by the selective actuation of actuators such as actuator 34 which collectively translate and rotate the saw box to achieve the optimized cutting solution while engaging the saws with a cant passing in direction B from the infeed conveyor 24 to the outfeed conveyor 36.

Figure 8:
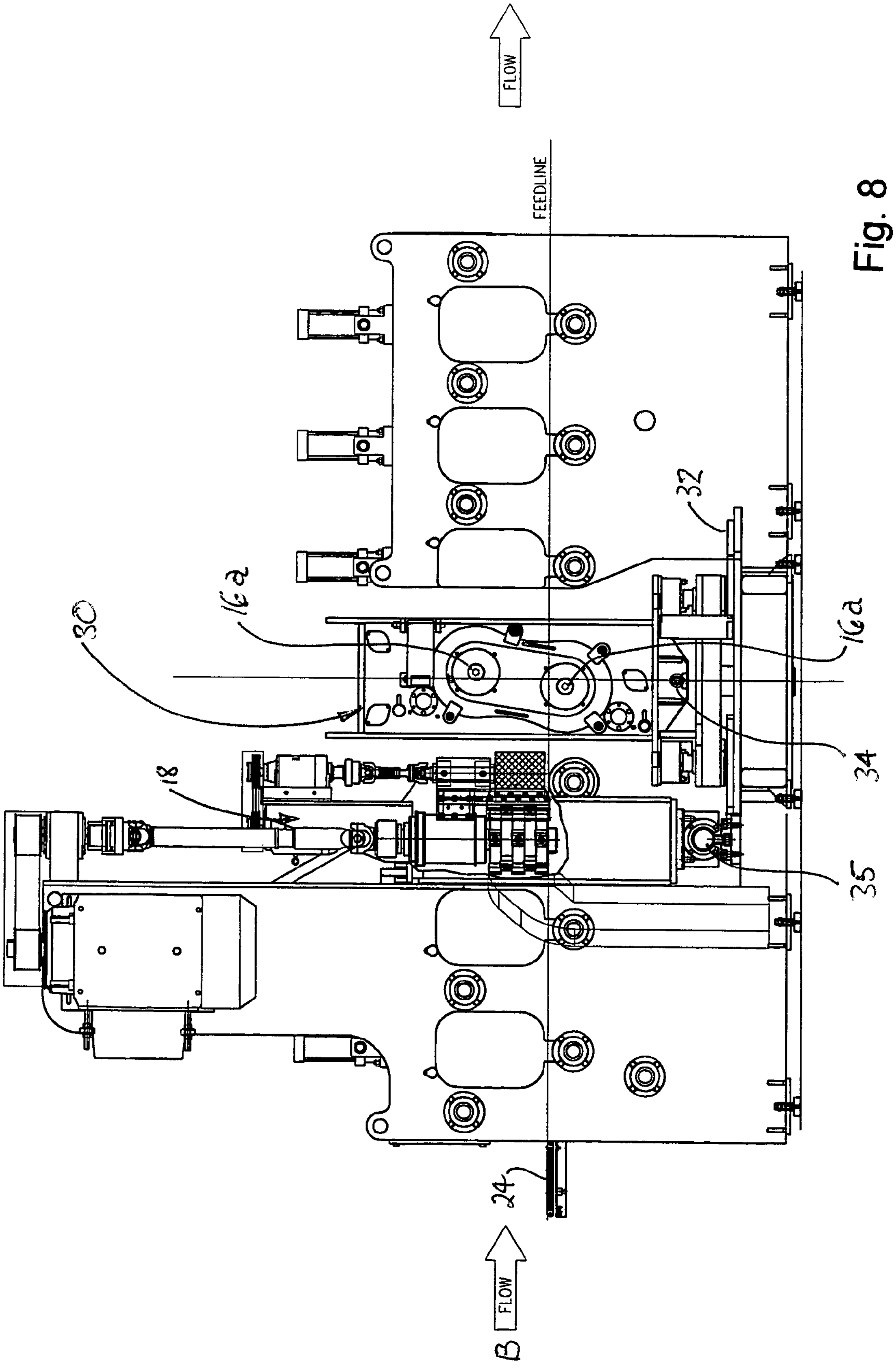
FIG. 8 is a side elevation view of an assembled curve sawing gang incorporating chipping heads according to the present invention mounted separately from the gang saw for independent movement of the chipping heads relative to the gang.

In FIG. 8 the chipping heads are mounted separately from the saws, saw arbors and saw box for movement of the chipping heads, for example laterally of the flow path, independently of the movement of the saws, for example by means of actuator 35.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for sawing a workpiece into parts of desired dimensions where the workpiece has non-uniform original dimensions comprising:

a transport conveyor for moving the workpiece along a path through a plurality or stations;

said plurality of stations including a workpiece scanning station including sensing means for sensing the dimensions of the workpiece and processing means associated with said sensing means for analyzing the sensed dimensions provided by said sensing means and providing an apparatus control instruction;

a chipping stations downstream of said scanning station including a pair of chipping heads mounted in laterally opposed relation on either side of said path on lateral translation means for selectively controllable independent lateral translation of said chipping heads relative to said transport conveyor;

a cutting station including a cutting tool movable relative to said transport conveyor to vary the position of said cutting tool relative to a workpiece being carried by said transport conveyor past said cutting tool and along said path;

means for independently actuating said lateral translation means with said processing means controlling actuation of said means for independently actuating said lateral translation means in accordance with said apparatus control instructions;

means for moving said cutting tool relative to said path with said processing means controlling actuation of said means for moving said cutting tool in accordance with said apparatus control instruction, said cutting tool being rotationally movable about a pivot axis relative to said path, wherein each chipping head of said pair of chipping heads is independently and actively laterally translatable so that at least one of said chipping heads is laterally translatable inwardly and outwardly relative to a workpiece when between said pair of chipping heads so as to recover a side board from a portion of the workpiece having a diameter larger than adjacent portions of the workpiece, wherein said cutting tool includes a gangsaw, and wherein said gang saw is pivotally movable relative to said transport conveyor to vary the position of said gang saw relative to a workpiece being carried by said transport conveyor past said gang saw and along said path, and wherein said apparatus further comprises means for moving said gang saw with said processing means controlling actuation of said means for moving said gang saw in accordance with said apparatus control instructions, and wherein said pair of chipping heads and said gang saw are mounted on a support frame for simultaneous pivotable movement of said pair of chipping heads and said gang saw whereby said pair of chipping heads and said gang saw are both commonly pivotally moveable relative to said transport conveyor to vary the position of both said pair of chipping heads and said gang saw relative to the workpiece being carried by said transport conveyor and along said path.

2. An apparatus for sawing a workpiece into parts of desired dimensions where the workpiece has non-uniform original dimensions comprising:

a transport conveyor for moving the workpiece along a path through a plurality of stations;

said plurality of stations including a workpiece scanning station including sensing means for sensing the dimensions of the workpiece and processing means associated with said sensing means for analyzing the sensed dimensions provided by said sensing means and providing an apparatus control instruction;

a chipping station downstream of said scanning station including a pair of chipping heads mounted in laterally opposed relation on either side of said path on lateral translation means for selectively controllable independent lateral translation of said chipping heads relative to said transport conveyor;

a cutting station including a cutting tool movable relative to said transport conveyor to vary the position of said cutting tool relative to a workpiece being carried by said transport conveyor past said cutting tool and alone said path;

means for independently actuating said lateral translation means with said processing means controlling actuation of said means for independently actuating said lateral translation means in accordance with said apparatus control instructions;

means for moving said cutting tool relative to said path with said processing means controlling actuation of said means for moving said cutting tool in accordance with said apparatus control instruction, said cutting tool being rotationally movable about a pivot axis relative to said path, wherein each chipping head of said pair of chipping heads is independently and actively laterally translatable so that at least one of said chipping heads is laterally translatable inwardly and outwardly relative to a workpiece when between said pair of chipping heads so as to recover a side board from a portion of the workpiece having a diameter larger than adjacent portions of the workpiece, further comprising a pair of press rolls mounted with one press roll of said press rolls on either side of said path and between said pair of chipping heads and said sawing station, each said press roll selectively laterally translatable on press roll translation means according to said apparatus control instructions so as to counter asymmetric lateral chipping forces of said path of chipping heads asymmetrically operating on the workpiece whereby lateral translation of the workpiece relative to said transport conveyor is inhibited, and further comprising a pair of anvils rigidly mounted to said pair of press rolls with one anvil of said pair of anvils on either side of said path and between said pair of chipping heads and said pair of press rolls, said pair of anvils laterally translatable simultaneously with said lateral translation of said pair of press rolls.

3. An apparatus for sawing a workpiece into parts of desired dimensions where the workpiece has non-uniform original dimensions comprising a transport conveyor for moving the workpiece along a path through a plurality of stations;

said plurality of stations including a workpiece scanning station including sensing means for sensing the dimensions of the workpiece and processing means associated with said sensing means for analyzing the sensed dimensions provided by said sensing means and providing an apparatus control instruction;

a chipping station downstream of said scanning station including a pair of chipping heads mounted in laterally opposed relation on either side of said path on lateral translation means for selectively controllable independent lateral translation of said chipping heads relative to said transport conveyor;

a cutting station including a cutting tool movable relative to said transport conveyor to vary the position of said cutting tool relative to a workpiece being carried by said transport conveyor past said cutting tool and along said path;

means for independently actuating said lateral transport means with said processing means controlling actuation of said means for independently actuating said lateral translation means in accordance with said apparatus control instructions;

means for moving said cutting tool relative to said path with said processing means controlling actuation of said means for moving said cutting tool in accordance with said apparatus control instruction, said cutting tool being rotationally movable about a pivot axis relative to said path, wherein each chipping head of said pair of chipping heads is independently and actively laterally translatable so that at least one of said chipping heads is laterally translatable inwardly and outwardly relative to a workpiece when between said pair of chipping heads so as to recover a side board from a portion of the workpiece having a diameter larger than adjacent portions of the workpiece.

further comprising a pair of press rolls mounted with one press roll of said press rolls on either side of said path and between said pair of chipping heads and said cutting station, each said press roll selectively laterally translatable on press roll translation means according to said apparatus control instructions so as to counter asymmetric lateral chipping forces of said pair of chipping heads asymmetrically operating on the workpiece whereby lateral translation of the workpiece relative to said transport conveyor is inhibited, wherein each said press roll is also pivotally mounted on press roll pivot means for pivoting of each said press roll about an axis of rotation of a corresponding chipping head of said pair of chipping heads simultaneously with said lateral translation of each said press roll.

4. The apparatus of claim 2 wherein each said press roll is also pivotally mounted on press roll pivot means for pivoting of each said press roll about an axis of rotation of a corresponding chipping head of said pair of chipping heads simultaneously with said lateral translation of each said press roll, and wherein each said anvil also simultaneously pivots about said axis of rotation.

5. An apparatus for sawing a workpiece into parts of desired dimensions where the workpiece has non-uniform original dimensions comprising:

a transport conveyor for moving the workpiece along a path through a plurality of stations;

said plurality of stations including a workpiece scanning station including sensing means for sensing the dimensions of the workpiece and processing means associated with said sensing means for analyzing the sensed dimensions provided by said sensing means and providing an apparatus control instruction;

a chipping station downstream of said scanning station including a pair of chipping heads mounted in laterally opposed relation on either side of said path on lateral translation means for selectively controllable independent lateral translation of said chipping heads relative to said transport conveyor;

a cutting station including a cutting tool movable relative to said transport conveyor to vary the position of said cutting tool relative to a workpiece being carried by said transport conveyor past said cutting tool and along said path;

means for independently actuating said lateral translation means with said processing means controlling actuation of said means for independently actuating said lateral translation means in accordance with said apparatus control instructions;

means for moving said cutting tool relative to said path with said processing means controlling actuation of said means for moving said cutting tool in accordance with said apparatus control instruction, said cutting tool being rotationally movable about a pivot axis relative to said path, wherein each chipping head of said pair of chipping heads is independently and actively laterally translatable so that at least one of said chipping heads is laterally translatable inwardly and outwardly relative to a workpiece when between said pair of chipping heads so as to recover a side board from a portion of the workpiece having a diameter larger than adjacent portions of the workpiece, wherein said cutting station is a sawing station downstream of said chipping station, said sawing station includes a gang saw, wherein said gang saw is pivotally movable relative to said transport conveyor to vary the position of said gang saw relative to the workpiece being carried by said transport conveyor past said gang saw and along said path, and wherein said apparatus further comprises means for moving said gang saw with said processing means controlling actuation of said means for moving said gang saw in accordance with said apparatus control instructions, and wherein said pair of chipping heads and said gang saw are mounted on a support frame for simultaneous pivotable movement of said pair of chipping heads and said gang saw whereby said pair of chipping heads and said gang saw are both commonly pivotally moveable relative to said transport conveyor to vary the position of both said pair of chipping heads and said gang saw relative to the workpiece being carried by said transport conveyor and along said path.

6. An apparatus for sawing a workpiece into parts of desired dimensions where the workpiece has non-uniform original dimensions comprising:

a transport conveyor for moving the workpiece along a path through a plurality of stations;

said plurality of stations including a workpiece scanning station including sensing means for sensing the dimensions of the workpiece and processing means associated with said sensing means for analyzing the sensed dimensions provided by said sensing means and providing an apparatus control instruction;

a chipping station downstream of said scanning station including a pair of chipping heads mounted in laterally opposed relation on either side of said path on lateral translation means for selectively controllable independent lateral translation of said chipping heads relative to said transport conveyor;

a cutting station including a cutting tool movable relative to said transport conveyor to vary the position of said cutting tool relative to a workpiece being carried by said transport conveyor past said cutting tool and along said path;

means for independently actuating said lateral translation means with said processing means controlling actuation of said means for independently actuating said lateral translation means in accordance with said apparatus control instructions;

means for moving said cutting tool relative to said path with said processing means controlling actuation of said means for moving said cutting tool in accordance with said apparatus control instruction, said cutting tool being rotationally movable about a pivot axis relative to said path, wherein each chipping head of said pair of chipping heads is independently and actively laterally translatable so that at least one of said chipping heads is laterally translatable inwardly and outwardly relative to a workpiece when between said pair of chipping heads so as to recover a side board from a portion of the workpiece having a diameter larger than adjacent portions of the workpiece, wherein said cutting station is a sawing station downstream of said chipping station, said sawing station includes a gang saw, further comprising a pair of press rolls mounted with one press roll of said press rolls on either side of said path and between said pair of chipping heads and said sawing station, each said press roll selectively laterally translatable on press roll translation means according to said apparatus control instructions so as to counter asymmetric lateral chipping forces of said pair of chipping heads asymmetrically operating on the workpiece whereby lateral translation of the workpiece relative to said transport conveyor is inhibited, and further comprising a pair of anvils rigidly mounted to said pair of press rolls with one anvil of said pair of anvils on either side of said path and between said pair of chipping heads and said pair of press rolls, said pair of anvils laterally translatable simultaneously with said lateral translation of said pair of press rolls.

7. An apparatus for sawing a workpiece into parts of desired dimensions where the workpiece has non-uniform original dimensions comprising:

transport conveyor for moving the workpiece along a path through a plurality of stations;

said plurality of stations including a workpiece scanning station including sensing means for sensing the dimensions of the workpiece and processing means associated with said sensing means for analyzing the sensed dimensions provided by said sensing means and providing an apparatus control instruction;

a chipping station downstream of said scanning station including a pair of chipping heads mounted in laterally opposed relation on either side of said path on lateral translation means for selectively controllable independent lateral translation of said chipping heads relative to said transport conveyor;

a cutting station including a cutting tool movable relative to said transport conveyor to vary the position of said cutting tool relative to a workpiece being carried by said transport conveyor past said cutting tool and along said path, means for independently actuating said lateral translation means with said processing means controlling actuation of said means for independently actuating said lateral translation means in accordance with said apparatus control instructions;

means for moving said cutting tool relative to said path with said processing means controlling actuation of said means for moving said cutting tool in accordance with said apparatus control instruction, said cutting tool being rotationally movable about a pivot axis relative to said path, wherein each chipping head of said pair of chipping heads is independently and actively laterally translatable so that at least one of said chipping heads is laterally translatable inwardly and outwardly relative to a workpiece when between said pair of chipping heads so as to recover a side board from a portion of the workpiece having a diameter larger than adjacent portions of the workpiece, wherein said cutting station is a sawing station downstream of said chipping station, said sawing station includes a gang saw, further comprising a pair of press rolls mounted with one press roll of said press rolls on either side of said path and between said pair of chipping heads and said sawing station, each said press roll selectively laterally translatable on press roll translation means according to said apparatus control instructions so as to counter asymmetric lateral chipping forces of said pair of chipping heads asymmetrically operating on the workpiece whereby lateral translation of the workpiece relative to said transport conveyor is inhibited, and wherein each said press roll is also pivotally mounted on press roll pivot means for pivoting of each said press roll about an axis of rotation of a corresponding chipping head of said pair of chipping heads simultaneously with said lateral translation of each said press roll.

8. The apparatus of claim 6 wherein each said press roll is also pivotally mounted on press roll pivot means for pivoting of each said press roll about an axis of rotation of a corresponding chipping head of said pair of chipping heads simultaneously with said lateral translation of each said press roll, and wherein each said anvil also simultaneously pivots about said axis of rotation.

9. The apparatus of claim 5 wherein said gang saw includes a saw arbor and wherein said pair of chipping heads and said gang saw are movable linearly across said path and are pivotally mounted so as to be rotationally movable relative to said path.

10. An apparatus for sawing a workpiece into parts of desired dimensions where the workpiece has non-uniform original dimensions comprising:

a transport conveyor for moving the workpiece along a path through a plurality of stations;

said plurality of stations including a workpiece scanning station including sensing means for sensing the dimensions of the workpiece and processing means associated with said sensing means for analyzing the sensed dimensions provided by said sensing means and providing an apparatus control instruction;

a chipping station downstream of said scanning station including a pair of chipping heads mounted in laterally opposed relation on either side of said path on lateral translation means for selectively controllable independent lateral translation of said chipping heads relative to said transport conveyor;

a cutting station including a cutting tool movable relative to said transport conveyor to vary the position of said cutting tool relative to a workpiece being carried by said transport conveyor past said cutting tool and alone said path;

means for independently actuating said lateral translation means with said processing means controlling actuation of said means for independently actuating said lateral translation means in accordance with said apparatus control instructions;

means for moving said cutting tool relative to said path with said processing means controlling actuation of said means for moving cutting tool in accordance with said apparatus control instruction, said cutting tool being rotationally movable about a pivot axis relative to said path, wherein each chipping head of said pair of chipping heads is independently and actively laterally translatable so that at least one of said chipping heads is laterally translatable inwardly and outwardly relative to a workpiece when between said pair of chipping heads so as to recover a side board from a portion of the workpiece having a diameter larger than adjacent portions of the workpiece, wherein said cutting station is a sawing station downstream of said chipping station, said sawing station includes a gang saw, wherein said gang saw is pivotally movable relative to said transport conveyor to vary the position of said gang saw relative to the workpiece being carried by said transport conveyor past said gang saw and along said path, and wherein said apparatus further comprises means for moving said gang saw with said processing means controlling actuation of said means for moving said gang saw in accordance with said apparatus control instructions, and wherein said pair of chipping heads, and wherein said pair of chipping heads and said cutting device are separate for movement of said pair of chipping heads independently of said cutting device whereby said pair of chipping heads and said cutting device are independently moveable relative to said transport conveyor to independently vary the position of both said pair of chipping heads and said cutting device relative to the workpiece being carried by said transport conveyor and along said path, wherein said cutting device includes a gang saw and wherein said pair of chipping heads and said gang saw are movable linearly across said path and are pivotally mounted so as to be rotationally movable relative to a base and said path.

* * * * *